June 2, 1964  W. CWYCYSHYN ETAL  3,135,385
ARTICLE FEEDING APPARATUS FOR INSPECTION EQUIPMENT
Filed Aug. 25, 1961
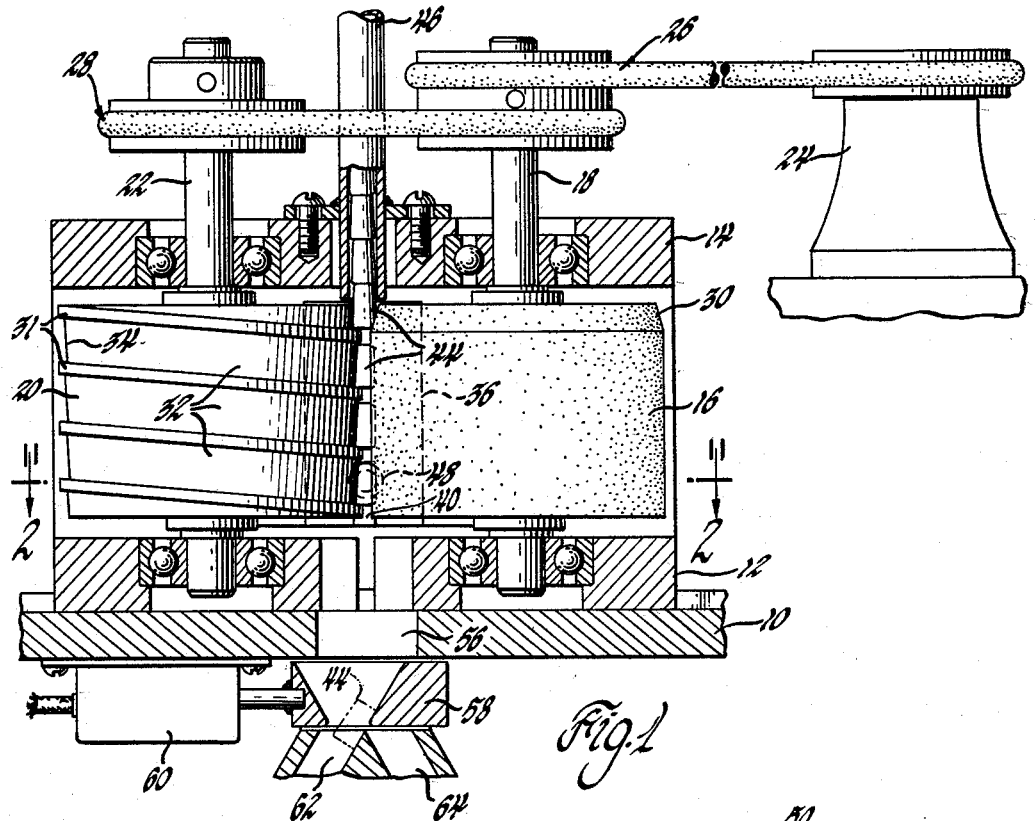
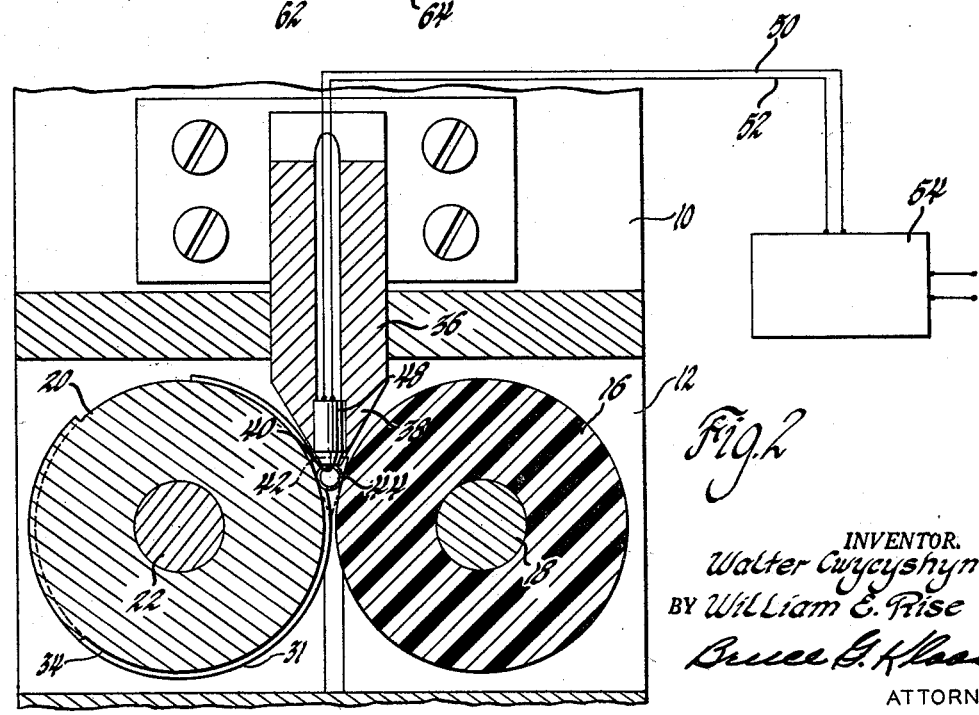
INVENTOR.
Walter Cwycyshyn &
BY William E. Rise
Bruce G. Klaas
ATTORNEY

United States Patent Office 3,135,385
Patented June 2, 1964

3,135,385
ARTICLE FEEDING APPARATUS FOR
INSPECTION EQUIPMENT
Walter Cwycyshyn, Detroit, Mich., and William E. Rise, Silver Spring, Md., assignors to General Motors Corporation, Detroit, Mich., a corporation of Delaware
Filed Aug. 25, 1961, Ser. No. 133,912
7 Claims. (Cl. 209—112)

This invention relates to article feeding apparatus and more particularly to article feeding apparatus for obtaining controlled and regulated movement of articles to be inspected to an inspection instrument.

In the production of high quality bearing elements, each of the bearing elements is conventionally subjected to a plurality of inspection tests to insure uniform quality. One of the inspection tests relates to the detection of surface flaws, such as seams on the bearing surface. In order to accurately inspect the surfaces of bearings for seams, or the like, an exact relationship must be maintained between the bearing elements being tested and the inspection apparatus. A common method of inspection of bearing elements for seams comprises the use of a sensing coil which is passed over the surface of the bearing elements to reflect the presence of seams by a change in an electrical signal generated by the sensing coil. Accurate detection of surface flaws requires the bearing elements to be maintained in a predetermined relationship relative to the coil without vibration, slip, bounce or loss of contact with the coil during the inspection cycle.

An object of this invention is to provide feed mechanism for conveying articles, such as tapered roller bearings, past a flaw inspection device in a regulated manner. A further object of this invention is to provide feed mechanism for conveying bearing elements or the like in a straight path at controlled rates of speed and with controlled spacing between adjacent bearing elements. Still another object of this invention is to provide a new and improved bearing inspection device utilizing novel feed mechanism. Other objects and advantages of the present invention are indicated in the following detailed description wherein reference is made to the accompanying drawing in which:

FIGURE 1 is a side elevational view, partly in section, of a preferred embodiment of the present invention; and FIGURE 2 is a sectional view taken along the line 2—2 in FIGURE 1.

Referring now to the drawings, the invention is illustrated by apparatus for inspecting tapered roller bearings for surface flaws. Although the details of construction of the apparatus are intended to be illustrative, some of the concepts involved have application elsewhere. In some respects, the apparatus has special advantages in connection with roller bearing elements and, more particularly, tapered roller bearing elements. The apparatus comprises a frame member 10 on which bearing plates 12, 14 are supported. A drive roll 16, mounted on a shaft 18, and a feed roll 20, mounted on a shaft 22, are rotatably supported between the bearing plates by suitable bearing elements. The rolls and shafts are parallelly aligned and adapted to be rotatively driven by a conventional electric motor 24 or the like through conventional belt and pulley arrangements 26, 28. The drive roll 16 is made from a conventional material, such as polyurethane rubber, or the like, which provides a resilient outer surface having good frictional characteristics to insure proper driving engagement with the articles to be driven thereby. The upper edge 30 of the drive roll is inwardly tapered for a purpose to be hereinafter described. The feed roll has a helicoid periphery comprising a helical guide flange 31, extending from one end of the guide roll 20 to the other, and a helical groove 32 having an inwardly and downwardly tapering bottom surface 34.

A backup plate 36 is mounted on the frame 10 between the shafts 18, 22, and has an inwardly tapered portion 38 which terminates in a flat backup surface 40 extending parallelly to the axes of rotation of the rolls 16, 20 and from one end of the rolls to the other. The drive roll 16, guide roll 20 and surface 40 are located closely adjacent one another to define a substantially triangular pocket 42 into which tapered roller bearings 44 are adapted to be fed by gravity from a conventional escapement mechanism 46. Suitable feed mechanism, such as a conventional vibratory bowl, may be provided to supply the tapered roller bearings to the escapement mechanism 46 in a similarly oriented position. A sensing coil 48 is mounted in the backup plate 36 and extends through an opening provided in the surface 40 and terminates in alignment therewith to form a substantially continuous surface. The sensing coil is connected in a conventional manner by leads 50, 52 to a conventional signal responsive apparatus 54. An exit port 56 is provided beneath the triangular pocket 42 and a gate element 58, operable by a solenoid 60, controls final disposition of the tested tapered roller bearings between an unexceptable chute 62 and an exceptable chute 64. The solenoid 60 is actuated in response to a signal generated by the apparatus 54.

In operation, the electric motor 24 drives the drive roll 16 and the feed roll 20 in the same direction at a suitable speed, such as 120 r.p.m. The tapered roller bearings 24 are fed into the escapement mechanism 46 with their enlarged ends downward so that the peripheral surfaces taper downwardly and outwardly. In this manner, tapered roller bearings are oriented and fed into the escapement mechanism 46, which feeds one roller bearing into the triangular pocket 42 per revolution of the feed roll 20. The polyurethane rubber drive roll 16 is provided with the reduced portion 30 to enable the tapered roller bearings to be gravity fed from the escapement mechanism into the triangular pocket. As the helicoid feed roll 20 rotates, a tapered roller bearing is seated on the upper surface of the guide flange 31 and is seated against the downwardly inclined groove surface 34. In this manner, the tapered roller bearings are pulled downwardly into the triangular pocket past the tapered portion 30 of the drive roll 16. The main portion of the triangular pocket is slightly smaller than the smallest tapered roller bearing to insure a press fit between the bearings and the surfaces forming the triangular pocket by adequate compression of the polyurethane drive roll. A definite preload of the bearings against the surface 40 of the backup member 36 is thereby obtained. In this manner, the tapered roller bearing is securely held between the drive roll 16, the feed roll 20 and the backup plate 36, and is carried downwardly along the face 40 by the feed roll 20 without wobble or slippage. Peripheral frictional engagement of the drive roll 16 with the tapered rollers causes rotation of the tapered rollers during movement along the face 40 through the triangular pocket. Since the diameter of the drive roll 16 is much greater than the diameter of the tapered roller bearings, the tapered roller bearings are rotated at substantially increased speeds. In the illustrative apparatus, with the drive roll and the feed roll being driven at 120 r.p.m., the tapered rollers in the triangular pocket will be rotated at approximately 1400 r.p.m. In this manner, each tapered roller bearing will complete approximately ten revolutions while in contact with the sensing head 48 so that the peripheral surface of each tapered roller bearing is completely scanned by the sensing coil. The sensing coil determines the acceptability of the part and the information is transferred through appropriate circuitry to the solenoid 60 of the gate 58 to cause the bearings to be deposited in the proper chute 62 or 64.

It is intended that obvious modifications in the details of construction and the arrangement of the parts are to be included within the scope of this invention as defined by the appended claims except insofar as limited by the prior art.

We claim:

1. In apparatus for testing the surface of an article for flaws, a drive roll for engaging the periphery of the articles to be tested and causing rotation thereof relative to a sensing means, a helicoid guide roll positioned adjacent said drive roll to regulate movement of the articles to be tested so that the articles move successively past said sensing means, a backup member located between said drive and guide rolls and having a backing surface for confining the articles to be tested between said drive roll and said guide roll and to limit movement of the articles to be tested to a linear path that is parallel to the axis of rotation of the articles, and said sensing means being associated with said backup member to detect flaws in the article to be tested during movement thereof along said backup member.

2. Means for positively driving tapered roller bearings or the like without slippage or wobble and comprising a drive roll having a resilient drive surface, a helicoid guide roll, and a backing plate located between said drive roll and said guide roll and having a backing surface defining a triangular pocket with the adjacent surface of said drive roll and said guide roll within which said tapered roller bearings may be driven therealong by rotation of said drive roll and said guide roll.

3. The apparatus as defined in claim 2 and wherein said helicoid guide roll comprises a helical bearing support flange extending from one end of said guide roll to the other end thereof, said guide flange being separated by a helical groove, said helical groove having a tapered side surface corresponding to the taper of said roller bearings whereby the roller bearings may be seated on said helical flange against the surface of the helical groove for controlled linear movement within said triangular pocket.

4. The apparatus as defined in claim 2 and wherein loading means are provided to load the tapered roller bearings into said triangular pocket, the portion of said drive roll adjacent said loading means being outwardly tapered relative to said triangular pocket to facilitate loading of the tapered roller bearings into said triangular pocket, the triangular pocket being smaller in cross-section than the tapered roller bearings to be tested so that the resilient drive surface of said drive roll will be compressed by the tapered roller bearings within said triangular pocket to provide a friction load on the tapered roller bearing within said triangular pocket and to cause rotation of the tapered roller bearings relative to the backing plate during movement through the triangular pocket.

5. Testing apparatus for detecting surface flaws in tapered roller bearings comprising a frame, a pair of shafts mounted in parallel spaced relationship on said frame, drive means to rotate said shafts, a drive roll mounted on one of said shafts for rotation therewith, said drive roll having a substantially flat peripheral surface formed of resilient material, a guide roll mounted on the other of said shafts for rotation therewith, said guide roll having a helical groove formed along the peripheral surface thereof, said helical groove being contoured to abuttingly support the tapered roller bearings, said drive roll being positioned relative to said guide roll so that the peripheral surfaces thereof are spaced closely adjacent one another along a line connecting the centers of said shafts, a backing plate fixedly supported relative to said drive roll and said guide roll and located in the V-shaped area defined by the adjacent peripheral surfaces of said drive roller and said guide roller, said backing plate having a support surface extending parallel to the axis of rotation of said shafts and forming a triangular pocket with the adjacent peripheral surfaces of said drive roller and said guide roller as defined by the support surface and lines drawn tangent to the peripheries of the drive roller and the guide roller adjacent the backing plate, a flaw sensing coil mounted in said backing plate, means to deliver tapered roller bearings into said pocket at one end of said guide roller, power means to drive said shafts and rotate said drive roller and said guide roller and thereby move said tapered roller bearings to the other end of said guide roller and past said sensing coil along said helical groove within said pocket with constant engagement with said drive roller, said guide roller and said backup plate, and means operable by said coil to segregate tapered roller bearings with flaws from tapered roller bearings without flaws as the tapered roller bearings are discharged from the triangular pocket.

6. Feed means for driving articles in a predetermined path and with predetermined displacement thereof within the confines of said path and comprising a helical guide roller having a seat to support and carry articles to be tested in a linear path between an entrance and an exit, a drive roller engageable with the articles to be tested to cause rotation thereof on said seat formed by said helical guide roller, and a backup member located between said drive and helical rollers and having a backing surface for maintaining the articles between said guide roller and said drive roller so as to prevent displacement of the articles from said seat on the guide roller.

7. Apparatus for scanning the surface of an article for flaws comprising flaw detecting means, a drive roll having a drive surface for engaging the article so as to generate rotation thereof relative to the flaw detecting means, a helical roll having a seat for supporting and carrying the article along a linear path past the flaw detecting means, and a backup member positioned between the drive and helical rolls for confining the article to the linear path so that the entire article is scanned by the flaw detecting means.

References Cited in the file of this patent
UNITED STATES PATENTS

| 1,157,199 | Williams | Oct. 19, 1915 |
| 1,866,957 | Wadsworth | July 12, 1932 |
| 2,353,813 | Deeren | July 18, 1944 |
| 2,778,497 | Bickley | Jan. 22, 1957 |